United States Patent
Kilkki et al.

(10) Patent No.: US 6,230,144 B1
(45) Date of Patent: May 8, 2001

(54) METHOD AND APPARATUS USING AN ACCOUNTING BIT FOR A SIMA NETWORK

(75) Inventors: Kalevi Kilkki; Jussi Ruutu, both of Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/110,706

(22) Filed: Jul. 7, 1998

(51) Int. Cl.$^7$ .................................................. G06F 17/60
(52) U.S. Cl. .............................. 705/30; 705/33; 705/34; 705/44; 705/26; 707/500; 707/506
(58) Field of Search .................... 705/30, 33, 34, 705/44, 26, 27–22; 707/500, 506, 505, 507; 709/200

(56) References Cited

U.S. PATENT DOCUMENTS

| 5,465,206 | 11/1995 | Hilt et al. |
| 5,749,078 | * 5/1998 | Gargiulio et al. ................... 705/404 |
| 5,825,883 | * 10/1998 | Archibald et al. ..................... 380/25 |
| 5,835,899 | * 11/1999 | Rose et al. ............................. 705/34 |
| 5,875,435 | * 2/1999 | Brown .................................. 705/30 |

(List continued on next page.)

FOREIGN PATENT DOCUMENTS

| 0 817 526 A2 | 1/1998 | (EP). |
| WO 97/37462 | 10/1997 | (WO). |
| WO 98/20434 | * 5/1998 | (WO) ............................. G06F/17/30 |

OTHER PUBLICATIONS

K. Kilkki, Simple Integrated Media Access (SIMA), Internet–Draft, Jun. 1997.*
A. Gupta, et al, "A Priority Pricing Approach to Manage Multi–Serive Class Networks in Real Time", MIT Workshop on Internet Economics, Mar. 1995.*
B. Stiller, et al, "Charging and Accounting for Integrated Internet Services—State of the Art, Problems, and Trends", (http://www.iam.unibe.ch/~balmer/papers/inet.htm).*

(List continued on next page.)

*Primary Examiner*—Vincent Millin
*Assistant Examiner*—Pedro R. Kanof
(74) *Attorney, Agent, or Firm*—Altera Law Group, LLC

(57) ABSTRACT

A cell format, an accounting device and a method for providing accounting information to a network for determining payment information between operators in the network. The cell format includes a data field including at least a portion of a data signal, a header field attached to the data field, the header field providing control information for processing the cell including a priority level field and an accounting field, wherein the accounting field indicates an entity that is to receive payment for the processing of the cell. The accounting bit is set to a first value to indicate that an entity on the ingress side of the network is to receive payment. The accounting bit is set to a first value to indicate that an entity on the egress side of the network is to receive payment. The entity is an Internet Service Operator. The first value includes a value of one. The accounting bits of each cell are counted along with the priority levels to determined whether an ingress side of the network is to compensate an egress side of the network or whether the egress side of the network is to compensate the ingress side of the network. The accounting device includes a reader for reading an accounting bit in a received cell, a counter for maintaining a record of cells containing an accounting bit and a controller, operatively coupled to the reader and counter, for incrementing the counter in response to the reader detecting the presence of an accounting bit in the received cell. The method includes the steps of detecting a value of an accounting bit in cells and collecting payment based upon the value of the accounting bit in the cells.

26 Claims, 5 Drawing Sheets

U.S. PATENT DOCUMENTS

| | | | | |
|---|---|---|---|---|
| 5,884,284 | * | 3/1999 | Peters et al. | 705/30 |
| 5,930,772 | * | 7/1999 | Gomyo et al. | 705/30 |
| 5,937,395 | * | 8/1999 | Iwamura | 705/30 |
| 6,047,326 | * | 4/2000 | Kilkki | 709/229 |

OTHER PUBLICATIONS

D. Clark, "Combining Sender and Receiver Payments in the Internet", Telecommunications Research Policy Conference, Oct. 1996.*

C. Mills et al., "Internet Accounting: Background", RFC 1272, Nov. 1991.*

N. Brownlee et al., "Traffic Flow Measurement: Architecture", RFC 2063, Jan. 1997.*

K. Kilkki et al., "High Quality and High Utilization—Incompatible Objectives for the Internet?", Sixth International Workshop on Quality of Service, May 1998, p. 65–67.*

N. Brownlee, "New Zealand Experiences with Network Traffic Charging", MIT Workshop of Internet Economics, Mar. 1995.*

Abstract for Japanese Patent No. 07264329 A, Oct. 13, 1995.

* cited by examiner

METHOD AND APPARATUS USING AN ACCOUNTING BIT FOR A SIMA NETWORK

BACKGROUND OF THE INVENTION

1. Field of the Invention

This invention relates in general to communications networks, and more particularly to a method and apparatus for providing information to network operators for determining cost accounting between the network operators.

2. Description of Related Art

The state of communications technology, particularly that which affects the Internet, is currently in flux and subject to rapid and often uncoordinated growth. The ubiquity and diversity of personal computers and set-top boxes has placed significant pressure on the providers of communications system infrastructure to accommodate the alarming increase in the number of new users that demand immediate access to Internet and other network resources. The rapid development of new and sophisticated software made available to users of such services places additional demands on system infrastructure.

Conducting commerce over the Internet and other networks is a practice that is gaining acceptance and popularity. By way of example, traditional on-line services, such as those offered by Internet providers, typically charge customers a monthly fee for access to basic services and resources, such as proprietary and public databases of information. Such traditional service providers also advertise any number of products or services which are purchasable on-line by the user.

Other forms of Internet commercialization currently being considered or implemented include offering of video and audio conferencing services, and a variety of other real-time and non-real-time services. The providers of these services, as well as the providers of communications system infrastructure, are currently facing a number of complex issues, including management of network capacity, load, and traffic to support real-time, non-real-time, and high-bandwidth services, and implementing a viable billing scheme that accounts for the use of such services.

The communications industry is expending considerable attention and investment on high speed solutions including gigabit networking. For example, one particular technology is referred to as asynchronous transfer mode (ATM). Those skilled in the art understand ATM to constitute a communications networking concept that can provide a capability to manage increases in network load, support both real-time and non-real-time applications, and offer, in certain circumstances, a guaranteed level of service quality.

A conventional ATM service architecture typically provides a number of predefined quality of service classes, often referred to as service categories. Each of the service categories includes a number of quality of service (QoS) parameters which define the nature of the respective service category. In other words, a specified service category provides performance to an ATM virtual connection (VCC or VPC) in a manner specified by a subset of the ATM performance parameters. The service categories defined in the ATM Forum specification reference herein below include, for example, a constant bit rate (CBR) category, a real-time variable bit rate (rt-VBR) category, a non-real-time variable bit rate (nrt-VBR) category, an unspecified bit rate (UBR) category, and an available bit rate (ABR) category.

The constant bit rate service class is intended to support real-time applications that require a fixed quantity of bandwidth during the existence of the connection. A particular quality of service is negotiated to provide the CBR service, where the QoS parameters include characterization of the peak cell rate (PCR), the cell loss rate (CLR), the cell transfer delay (CTD), and the cell delay variation (CDV). Conventional ATM traffic management schemes guarantee that the user-contracted QoS is maintained in order to support, for example, real-time applications, such as circuit emulation and voice/video applications, which require tightly constrained delay variations.

The non-real-time VBR service class is intended to support non-real-time applications, where the resulting network traffic can be characterized as having frequent data bursts. Similarly, the real-time variable bit rate service category may be used to support "bursty" network traffic conditions. The rt-VBR service category differs from the nrt-VBR service category in that the former is intended to support real-time applications, such as voice and video applications. Both the real-time and non-real-time VBR service categories are characterized in terms of a peak cell rate (PCR), a sustainable cell rate (SCR), and a maximum burst size (MBS).

The unspecified bit rate (UBR) service category is often regarded as a "best effort service," in that it does not specify traffic-related service guarantees. As such, the UBR service category is intended to support non-real-time applications, including traditional computer communications applications such as file transfers and e-mail.

The available bit rate (ABR) service category provides for the allocation of available bandwidth to users by controlling the rate of traffic through use of a feedback mechanism. The feedback mechanism permits cell transmission rates to be varied in an effort to control or avoid traffic congestion, and to more effectively utilize available bandwidth. A resource management (RM) cell precedes the transmission of data cells, which is transmitted from source to destination and back to the source, in order to provide traffic information to the source.

Although the current ATM service architecture described above would appear to provide, at least at a conceptual level, viable solutions to the many problems facing the communications industry, ATM, as currently defined, requires implementation of a complex traffic management scheme in order meet the objectives articulated in the various ATM specifications and recommendations currently being considered. In order to effectively manage traffic flow in a network, conventional ATM traffic management schemes must assess a prodigious number of traffic condition indicators, including service class parameters, traffic parameters, quality of service parameters and the like. A non-exhaustive listing of such parameters and other ATM traffic management considerations is provided in ITU-T Recommendation I.371, entitled Traffic Control and Congestion Control in B-ISDN, and in Traffic Management Specification, version 4.0 (af-tm-0056.000, April 1996), published by the Technical Committee of the ATM Forum.

Nevertheless, ATM is the current technology of choice when quality of service guarantees are critical. Still, Gigabit Ethernet is simpler, and a less expensive alternative in LAN environments where it is often more expedient to overbuild network capacity. Regardless of the technology, the increased bandwidth improved flow control is necessary in the developing high speed networks to prevent traffic loss.

Notwithstanding the complexity of conventional traffic management schemes, current specifications and recommendations fail to adequately address the need of service providers for a methodology that provides for accurate and reliable charging of services utilized by user's of the network.

In global Internet there are a huge number of network operators and service provides. As the packets in the network goes typically through several networks managed by different operators, some type of contracts are needed to regulate the traffic. Up to now, these contracts have typically been based on the principle that two adjacent operators transmit the traffic from the other operator's network free of charge, and the only restriction has been the link capacity between networks.

This arrangement works quite well as far as the network service is based on a best effort service without any resource reservation or usage based charging. But now the situation is changing dramatically due to the emerging resource reservation protocols, guaranteed services etc. There is a compelling need to control more thoroughly the traffic between operators, and specify what kind of compensation is needed. These contracts tend to be quite complicated as there are several service classes with different quality and traffic parameters. Thus, the control system of the contract will be complicated and hard to implement.

Up to now, there have not been any realistic, that is simple enough, proposals for controlling and charging the traffic between network operators in cases where guaranteed services with resource reservation are used. Current systems, if there is any realistic one, are complex and difficult to manage. For example, a charging scheme that accounts for most or all of the currently defined ATM traffic management properties would necessarily be complex and would typically require administration by highly skilled operators. The high overhead and maintenance costs to support such a billing scheme would likely be passed on to the network provider and, ultimately, to the network user.

Some commentators have suggested that a solution to these problems may be found by increasing the bandwidth or capacity of the network (e.g., the Internet). Implementing this overly simplistic solution would require an appreciable investment of hardware, software, and, most likely, replacing existing communication lines with high bandwidth transmission lines, such as fiber optic lines. This suggested solution, however, would likely result in undisciplined network expansion and uncoordinated management of network traffic. Also, such a solution, if implemented, would appear to obviate the need for much of the sophisticated traffic management features currently defined in ATM specifications.

It can be seen that there is a need for a device which can be used to control the traffic between network operators.

It can also be seen that there is a need for a system which can be used to fairly divide the costs and incomes between operators.

SUMMARY OF THE INVENTION

To overcome the limitations in the prior art described above, and to overcome other limitations that will become apparent upon reading and understanding the present specification, the present invention discloses a system which can be used to fairly divide the costs and incomes between operators.

The present invention solves the above-described problems by providing all necessary information for controlling the traffic between network operators in every packet. This means that by using a relatively simple device which uses only the information in the packets, every operator is able to know how the incomes are distributed.

A system in accordance with the principles of the present invention includes a cell format for a cell communicated from a first side of a network to a second side of a network including a data field including at least a portion of a data signal, a header field attached to the data field, the header field providing control information for processing the cell including a priority level field and an accounting field, wherein the accounting field indicates an entity that is to receive payment for the processing of the cell.

Other embodiments of a system in accordance with the principles of the invention may include alternative or optional additional aspects. One such aspect of the present invention is that the accounting bit is set to a first value to indicate that an entity on the ingress side of the network is to receive payment.

Another aspect of the present invention is that the accounting bit is set to a first value to indicate that an entity on the egress side of the network is to receive payment.

Another aspect of the present invention is that the entity is an Internet Service Operator.

Another aspect of the present invention is that the first value includes a value of one.

Another aspect of the present invention is that the accounting bits of each cell are counted along with the priority levels to determined whether an ingress side of the network is to compensate an egress side of the network or whether the egress side of the network is to compensate the ingress side of the network.

Another aspect of the present invention is that an embodiment of the invention includes an accounting device for maintaining accounting information regarding the processing of cells in a network, wherein the accounting device includes a reader for reading an accounting bit in a received cell, a counter for maintaining a record of cells containing an accounting bit and a controller, operatively coupled to the reader and counter, for incrementing the counter in response to the reader detecting the presence of an accounting bit in the received cell.

Another aspect of the present invention is that a method of determining accounting between operators in a network includes the steps of detecting a value of an accounting bit in cells and collecting payment based upon the value of the accounting bit in the cells.

Another aspect of the present invention is that the method includes the steps of detecting the value in a priority level field in the cells, computing weighted loads in each direction across the network and allocating payment between the operators according to the relationship of the weighted loads.

Another aspect of the present invention is that the step of computing the weighted loads further includes the step of computing a weighted load in a first direction according to:

$$R(A, 0) = \sum_{i:AB=0} S(i) \cdot 2^{P(i)} \text{ and}$$

$$R(A, 1) = \sum_{i:AB=1} S(i) \cdot 2^{P(i)} \text{ in direction } A,$$

wherein $R(A,0)$ is the weighted load in a first direction having an accounting bit set to a first value and $R(A,1)$ is the weighted load in the first direction having an accounting bit set to a second value.

Another aspect of the present invention is that the step of computing the weighted loads further includes the step of computing a weighted load in a second direction according to:

$$R(B, 0) = \sum_{i:AB=0} S(i) \cdot 2^{p(i)} \text{ and}$$

$$R(B, 1) = \sum_{i:AB=1} S(i) \cdot 2^{p(i)} \text{ in direction } B,$$

wherein R(B,0) is the weighted load in a second direction having an accounting bit set to a first value and R(B,1) is the weighted load in the second direction having an accounting bit set to a second value.

Another aspect of the present invention is that the method further includes the step of summing the weighted load in the first direction having an accounting bit set to a first value and the weighted load in the second direction having an accounting bit set to a second value.

Another aspect of the present invention is that the method further includes the step of summing the weighted load in the first direction having an accounting bit set to a second value and the weighted load in the second direction having an accounting bit set to a first value.

Another aspect of the present invention is that the method further includes the step of comparing the two sums to determine which of the operators generated more income and equalizing the payments between the operators according to the comparison of the two sums.

Another aspect of the present invention is that the method further includes the steps of comparing R(A,0)+R(B,1) to R(A,1)+R(B,0) and equalizing income between the operators by transferring a payment value equal to the half the difference from the operator earning more to the operator earning less.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method for fairly dividing network costs and incomes among network operators by using an accounting bit in the SIMA cell. The present invention is based on SIMA service, and an accounting bit in every packet. SIMA service is based on the use of 3 priority bits which determines, on the one hand, the importance of the packet and, on the other hand, the price that has been paid for the transmission of the packet. An accounting bit is added to the cell to indicate which side of the interface the operator that gets the money from the customer is located on. Using this information, located in every packet or cell, the invention describes a system which can be used to fairly to divide the costs and incomes between operators. For purposes of clarity, the term "cell " is used herein to represent cell or packet. Accordingly, those skilled in the art will recognize that the invention is not meant to be limited to a particular technology such as IP or ATM networks, since the main difference between ATM and IP, as regards a SIMA network, is that ATM has fixed size packets while the size of IP packets can vary.

Figure 1:
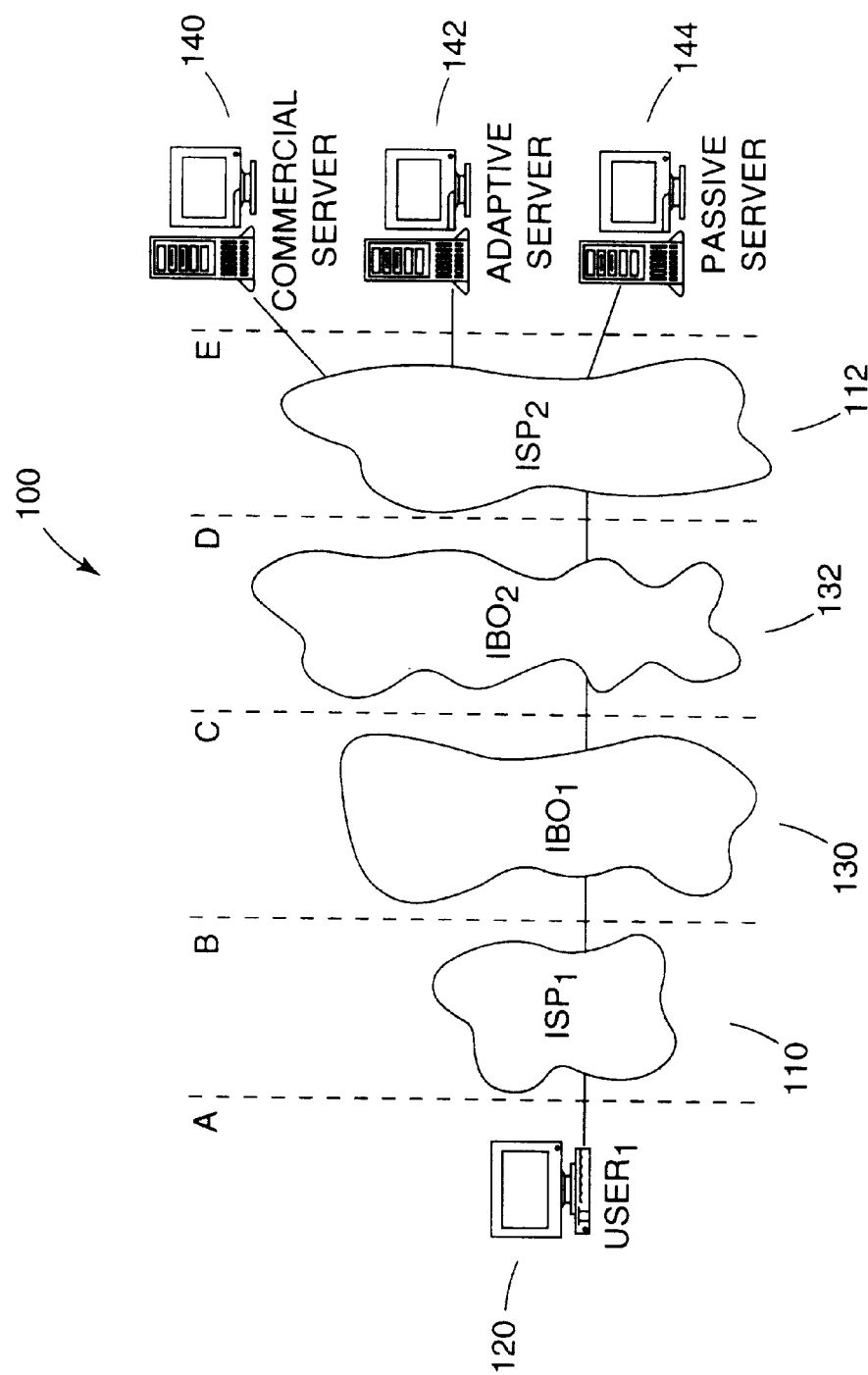
FIG. 1 illustrates a simplified network structure.

FIG. 1 illustrates a simplified network structure 100. The network structure includes Internet Service Providers (ISPs) 110, 112, Users (U) 120, Internet Backbone Operators (IBOs) 130, 132 and Servers (S) 140, 142, 144. In FIG. 1, $ISP_1$ 110 and $ISP_2$ 112 represent Internet Service Providers. The main property of ISPs 110, 112 is that they have direct contact with the user 120 and servers 140, 142, 144 as regards both the physical medium and the service contract. In FIG. 1, the user 120 pays only directly to $ISP_1$ 110 not to the IBOs 120, 122. This is in accordance with the "SIMA logic" since the user 120 doesn't have to know anything about the network or IBOs.

Furthermore with respect to FIG. 1, $U_1$ represents a user which is connected to $ISP_1$ 110 The user $U_1$ makes a contract with $ISP_1$, and in case of SIMA service, the contract is based on NBR, wherein user $U_1$ buys $NBR_1$ from $ISP_1$. $IBO_1$ 130 and $IBO_2$ 132 represent a first and second Internet Backbone Operator. Most of the traffic transmitted in the network is not local. This means that ISPs 110, 112 must use a backbone network operated typically by some other organization or IBO 130, 132.

Finally, Servers ($S_i$) 140, 142, 144 are special users of ISP 112 or IBOs 130, 132. Generally, there are three types of servers. First there is the commercial server 140. With commercial server 140, the user 120 makes direct contract with the server (or content provider) and usually, the owner of the server 140 pays all transmission fees. Then there is the adaptive server 142. In this case, the user 120 has no contract with the owner of the adaptive server 142. However, the adaptive server 142 has some capability to handle and utilize the information it gets from the SIMA network, e.g., about the NBR of the flow. Finally, there is the passive server 144. In this case the passive server 144 is connected to the SIMA network with a permanent NBR, but the passive server 144 itself works on a pure best-effort basis, without any knowledge about the characteristics of SIMA network.

However, in principle, there is no significant difference between users 120 and servers 140, 142, 144, as far as the physical layer functions are concerned. The main difference pertinent to this discussion is that servers 140, 142, 144 are supposed to have a plurality of flows in progress at the same time.

As stated above, however, there is no clear plan or means for determining who pays for what. For example, if the user 120 is buying something from a commercial server, it is reasonable to suppose that the transmission needed by the service, e.g., video, is included in the total service paid by the user 120. Hence, the return direction from the servers 140, 142, 144 to the user 120 is paid by the servers 140, 142, 144, and $ISP_2$ gets the money.

On the other hand, in most cases there is no actual contract between user 120 and the server 140, 142, 144, in particular if the servers is a passive server 144. In that case, if the user 120 wants more capacity than other users (not shown), the user 120 pays the transmission of return direction as well. Hence, $ISP_1$ gets the money if we suppose that each user has contract with only one ISP.

Without an additional mechanism, it is impossible to know who is "responsible" for a cell, or who has paid the transmission. A real problem arises when the IBOs 130, 132 make contracts with each other. The contract may include a volume based element, which in a SIMA environment should take into account the priority of the cell. But it is difficult if not impossible for an IBO 130, 132 to control the contract if it does not know which cells belong to it and which ones belong to the other operator. The direction of transmission does not tell that, as the above examples illustrate.

Figure 2:
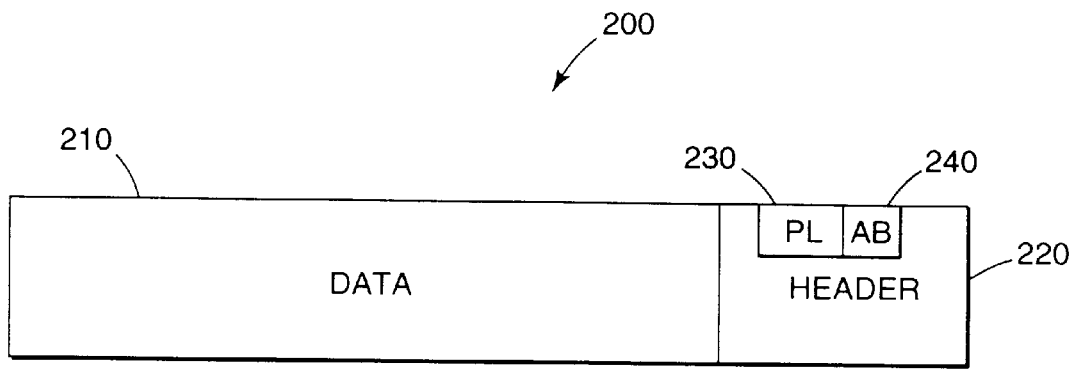
FIG. 2 illustrates a cell or packet containing an additional accounting bit according to the present invention.

Nevertheless, these limitations can be overcome if an additional bit is included in every cell to indicate which side of the network the payer of the cell is located. FIG. 2 illustrates a cell or packet 200 containing an additional accounting bit according to the present invention. The cell includes a data portion 210 and a header 220. Priority level (PL) bits 230 are used to establish the priority levels within the SIMA concept. In FIG. 2, the priority level (PL) 230 are shown within the header. Then, according to the invention, an accounting bit (AB) 240 is utilized in the cell to providing the needed accounting information.

According to the SIMA concept each customer shall define only two issues before a connection establishment: a nominal bit rate (NBR) and the selection between real-time and non-real-time service classes. NBR forms the basis of charging, and it defines how the network capacity is divided among different connections during overload situations. While the network operator does not guarantee the continuous availability of nominal bit rate, the user is allowed to send data with any bit rate independently of the NBR.

SIMA service uses 3 bits in each ATM cell for the determination of cell priority 230 (or 2 additional bits if the current cell loss priority, CLP, bit in the cell header is used). In addition, one bit is needed due to the sorting of real-time and non-real-time connections. An approach in which the real-time/non-real-time bit is included in every cell, may further simplify the implementation of SBU units and core network nodes as the units do not need to keep record of every connection.

The Generic Flow Control (GFC) field may be used to provide the 4 bits priority level bits 230 in the cell header. In this case all the 3 priority bits and rt/nrt-bit can be situated in the cell header. If this is not possible, the required bits (2, 3 or 4 depending on the use of CLP bit and the status of rt/nrt bit) are situated outside the current cell header (not illustrated).

In any event, SIMA service is based on the use of 3 priority bits 230 which determines, on the one hand, the importance of the cell and, on the other hand, the price that has been paid for the transmission of cell. The addition of an accounting bit 240 indicates which side of the interface the operator that gets the money from the customer is on. From the accounting bit 240, located in every cell 200, the invention describes a system which can be used to fairly divide the costs and incomes between operators.

Figure 3:
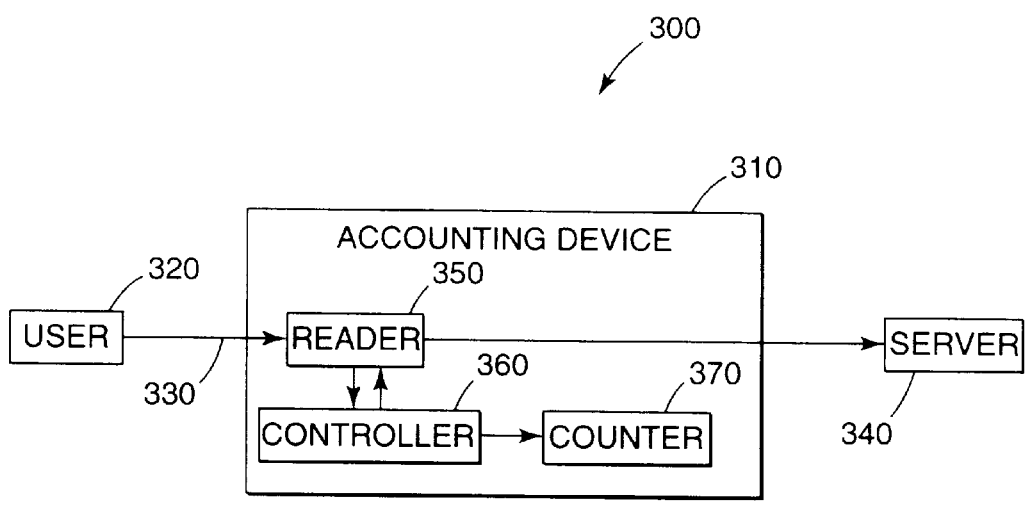
FIG. 3 illustrates a device for providing accounting between operators.

Accordingly, a network operator can monitor cells going in both directions. The needed information for each cell is the priority level 230, cell size (not shown) and accounting bit 240. FIG. 3 illustrates a device 300 for providing accounting between operators.

In FIG. 3, a user 320 is illustrated routing a cell 330 to a server 340. A reader 350 analyzes the accounting bit of each cell. Based on the values of these parameters, a controller 360 increases the value of corresponding counter 370. After a certain period, the value of the counters 370 are processed to determine whether compensation is needed between operators.

Figure 4:
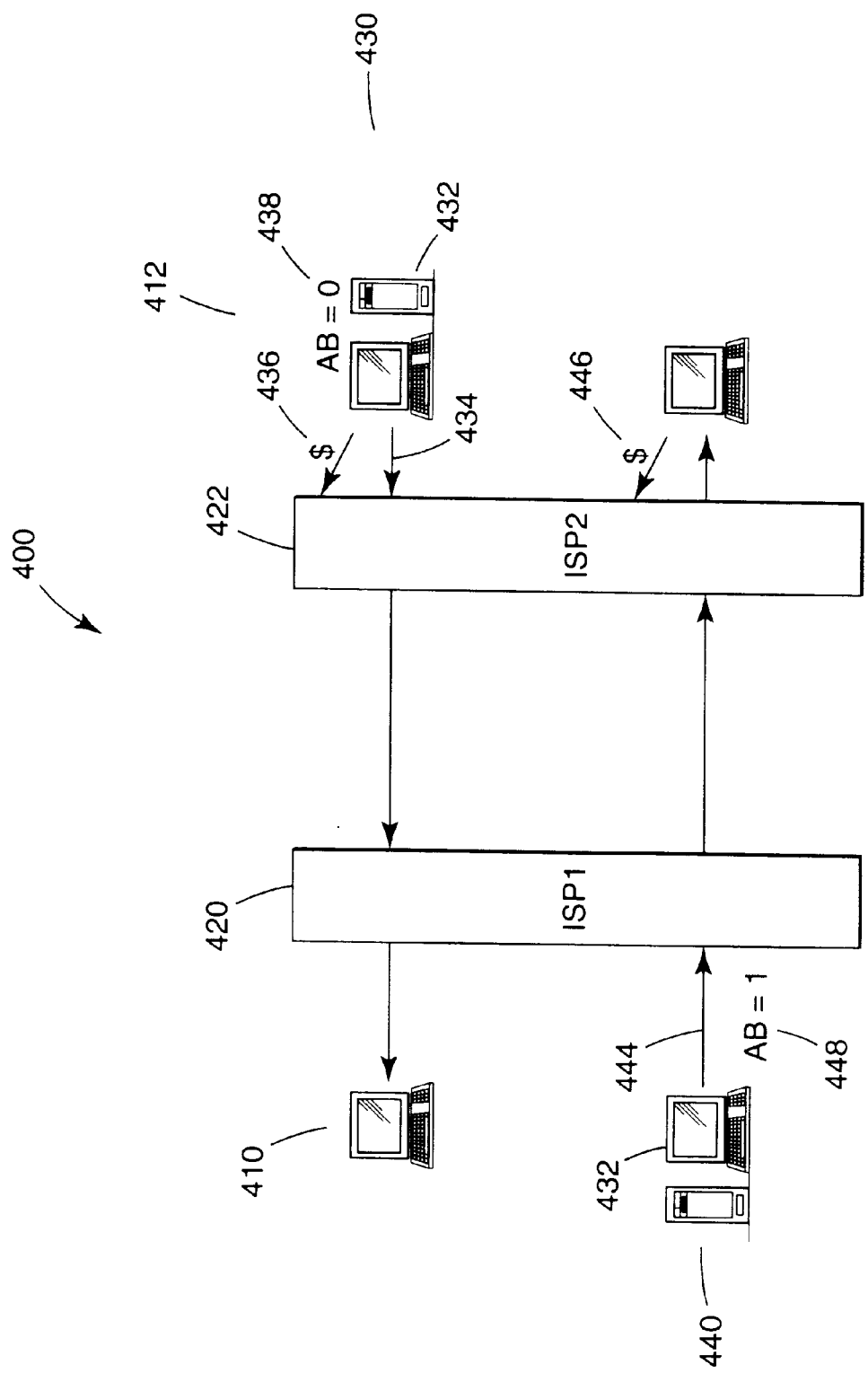
FIG. 4 illustrates traffic being routed between users on opposite sides of two ISPs.

A system operating in accordance with cells containing accounting bits will be described herein with reference to FIG. 4. FIG. 4 illustrates traffic being routed between users 410, 412 on opposite sides of two ISPs 420, 422.

The default situation 430 is that the cell is paid by the ingress side of the flow. In this scenario, the user 432 that sends the cells 434 into the network 422 pays the respective ISP 422 the money 436. In that case the value of accounting bit is 0 438.

The other extreme case is that the whole transmission is paid by the egress side 440. In this scenario, the user 442 that receives the cells 444 from the network pays 446 for the service. Then every cell is marked by accounting bit 1 448.

In addition, it is possible that both the ingress and egress users pay part of the transmission. If, for instance, ingress side pays NBR=50 kbit/s and egress side pays NBR=150 kbit/s, the total NBR used for determining priorities is 200 kbit/s. Then ¼ of the accounting bits in the transmitted cells shall be 0 and the balance of the cells shall have an accounting bit set to 1. This is easily realized at the ingress access node, since it must be aware of the NBR related to the flow.

Figure 5:
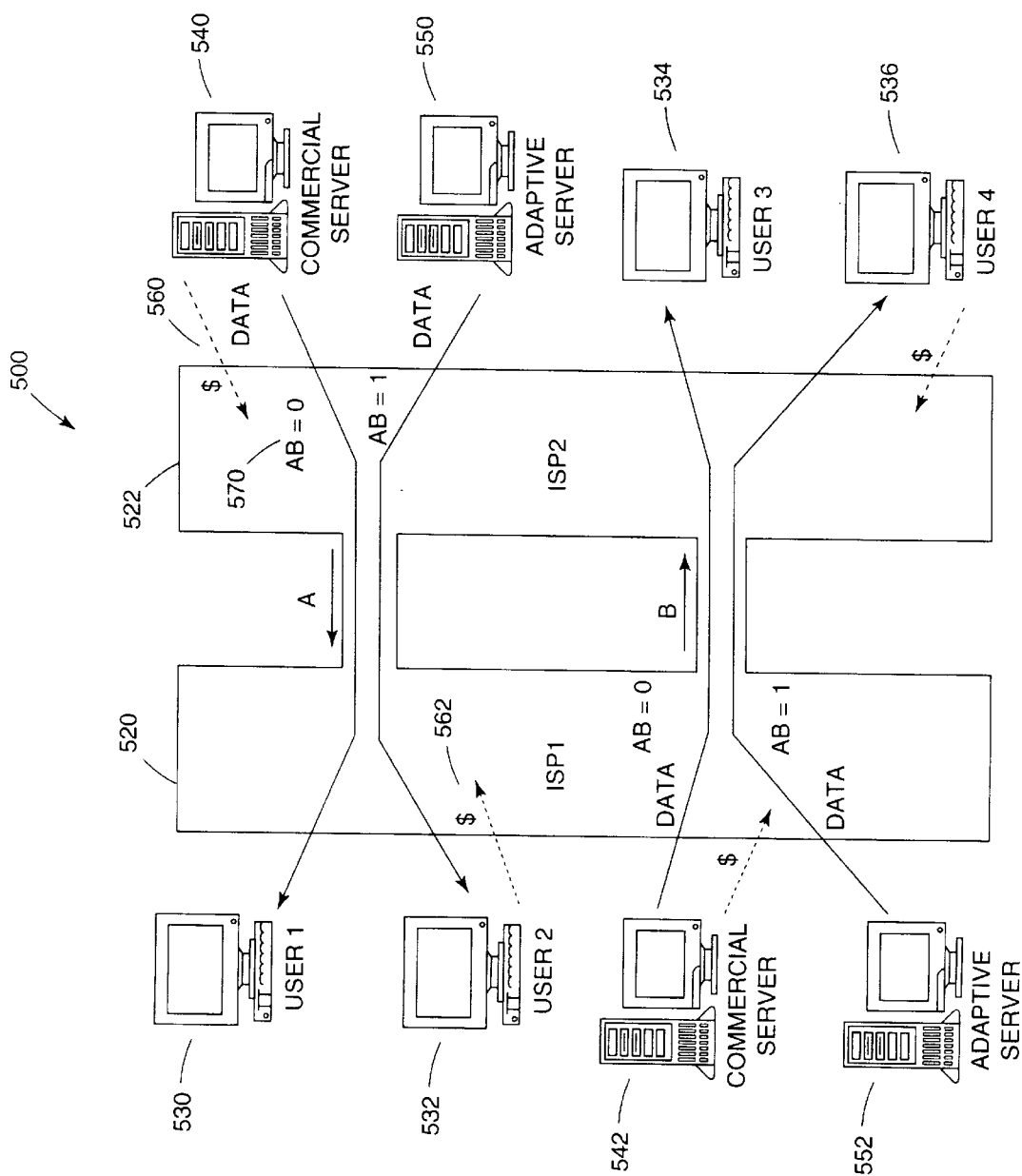
FIG. 5 is a system having two ISPs that illustrates the use of the accounting bits according to the present invention for defining the responsibility of collecting fees from users.

The problem and the solution are further illustrated in FIG. 5. In FIG. 5, there are only 2 ISPs 520, 522. In communication with the ISPs 520, 522 there are users 530, 532, 534, 536, commercial servers 540, 542 and adaptive servers 550, 552.

In FIG. 5, User 1 530 wants information from commercial server 1 540. As the transmission fee is included in the service contract, ISP2 522 collect all the transmission fees 560 from commercial server 1 540. Cells are marked with accounting bit 0 (or AB=0) 570. In contrast, user 2 532 utilizes an adaptive server 2 550, and must, therefore, use his own NBR. NBR is sent to the access node of ISP2 522, although ISP1 520 gets the money 562. In this case cells are marked with AB=1 572, because the receiver pays (or actually, because the ISP1 520 gets money). If we mark the direction from ISP1 to ISP2 by A 580 and reverse direction B 582 we obtain 4 different aggregate traffic flows, depending on the payer and the direction of the cells.

Figure 6:
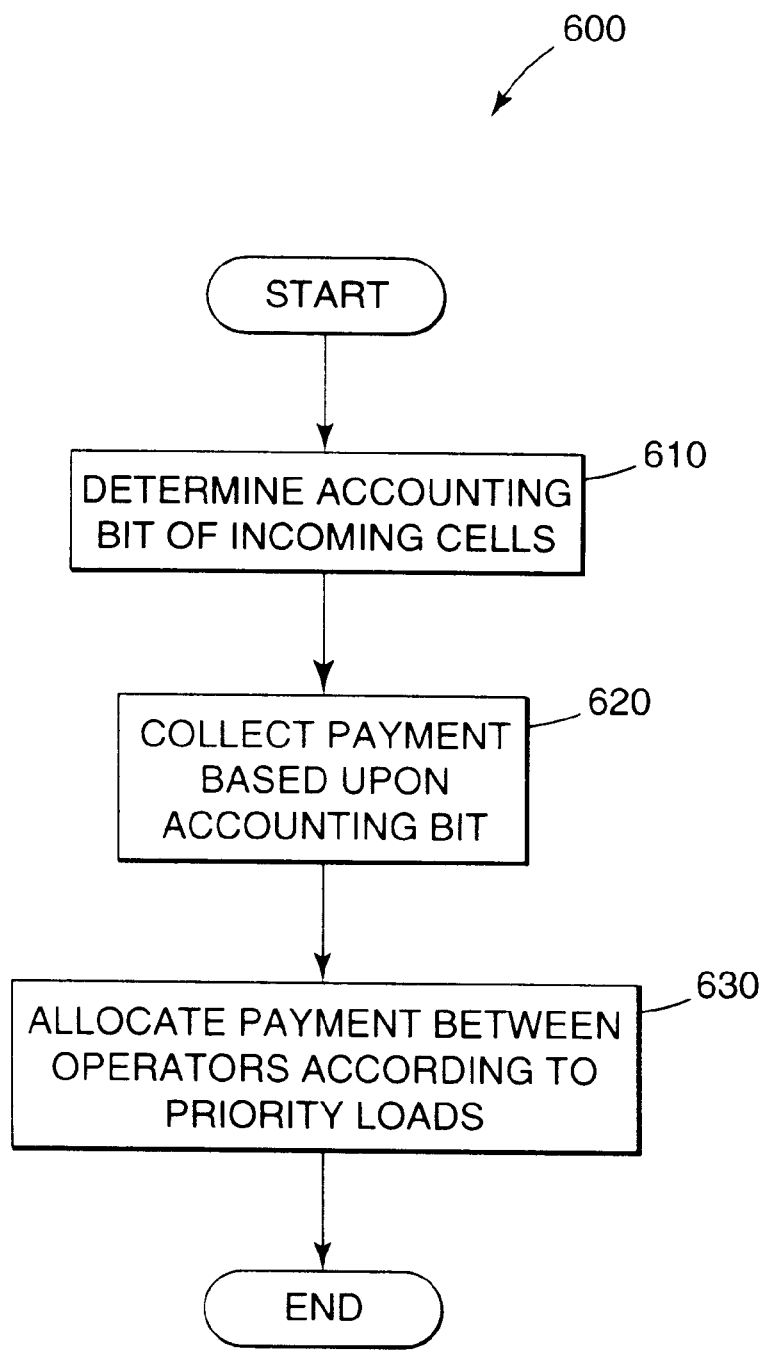
FIG. 6 illustrates a flow chart of the method for using the accounting bits and the priority level of cells for payment equalization between operators.

Also, in SIMA it is necessary to take into account the priority of every cell. FIG. 6 illustrates a flow chart of the method for using the accounting bits and the priority level of cells for payment equalization between operators 600. In FIG. 6, the system still determines the accounting bits of the cells 610. Payment is collected by the operators in accordance with the status of the accounting bits. However, the priority levels must also be taken into consideration. As a consequence, for the control of the contract between operators ISP1 and ISP2, the following weighted loads must be measured:

$$R(A, 0) = \sum_{i:AB=0} S(i) \cdot 2^{p(i)} \text{ and}$$

$$R(A, 1) = \sum_{i:AB=1} S(i) \cdot 2^{p(i)} \text{ in direction } A, \text{ and}$$

$$R(B, 0) = \sum_{i:AB=0} S(i) \cdot 2^{p(i)} \text{ and}$$

$$R(B, 1) = \sum_{i:AB=1} S(i) \cdot 2^{p(i)} \text{ in direction } B,$$

where p(i) is the priority of cell i, and S(i) is the size of the cell i.

The operators may utilize these load values for equalizing their incomes 630: For example, if R(A,0)+R(B,1)>R(A,1)+R(B,0) then ISP1 earns less money than ISP2 (from their common traffic load), and therefore ISP2 shall pay compensation due to the imbalance.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A data cell for a cell communicated from a first side of a network to a second side of a network, comprising:
    a data field comprising at least a portion of data;
    a header field attached to the data field, the header field providing control information for processing the cell including a priority level field and an accounting field, wherein the accounting field indicates a side of the network responsible for payment for data transfer.

2. The cell of claim 1 wherein the accounting bit is set to a first value to indicate that an entity on the ingress side of the network is to receive payment.

3. The cell of claim 2 wherein the entity is an Internet Service Operator.

4. The cell of claim 2 wherein the first value comprises a value of zero.

5. The cell of claim 1 wherein the accounting bit is set to a first value to indicate that an entity on the egress side of the network is to receive payment.

6. The cell of claim 5 wherein the entity is an Internet Service Operator.

7. The cell of claim 5 wherein the first value comprises a value of one.

8. The cell format of claim 1 wherein the accounting bits of each cell are counted along with the priority levels to determine whether an ingress side of the network is to compensate an egress side of the network or whether the egress side of the network is to compensate the ingress side of the network.

9. An accounting device maintaining accounting information regarding the processing of cells in a network, the accounting device comprising:
    a reader for reading an accounting bit in a received cell, wherein the accounting bit indicates a side of the network responsible for payment for data transfer;
    a counter for maintaining a record of cells containing an accounting bit; and
    a controller, operatively coupled to the reader and counter, for incrementing the counter in response to the reader detecting the presence of an accounting bit in the received cell.

10. The accounting device of claim 9 wherein a value in the counter indicates the number of cells received that have an accounting bit set to a first value indicating that an entity is to receive payment for the processing of the cell.

11. The accounting device of claim 9 wherein the accounting bit is set to a first value to indicate that an entity on the ingress side of the network is to receive payment.

12. The accounting device of claim 11 wherein the entity is an Internet Service Operator.

13. The accounting device of claim 11 wherein the first value comprises a value of zero.

14. The accounting device of claim 9 wherein the accounting bit is set to a first value to indicate that an entity on the egress side of the network is to receive payment.

15. The accounting device of claim 14 wherein the entity is an Internet Service Operator.

16. The accounting device of claim 14 wherein the first value comprises a value of one.

17. The accounting device of claim 9 wherein the accounting bits of each cell are counted along with the priority levels to determine whether an ingress side of the network is to compensate an egress side of the network or whether the egress side of the network is to compensate the ingress side of the network.

18. A method of determining accounting between operators in a network, comprising the steps of:
    detecting a value of an accounting bit in cells indicating a side of the network responsible for payment for data transfer; and
    collecting payment based upon the value of the accounting bit in the cells.

19. The method of claim 18 further comprising the steps of:
    detecting the value in a priority level field in the cells;
    computing weighted loads in each direction across the network; and
    allocating payment between the operators according to the relationship of the weighted loads.

20. The method of claim 19 wherein the step of computing the weighted loads further comprises the step of computing a weighted load in a first direction according to:

$$R(A, 0) = \sum_{i:AB=0} S(i) \cdot 2^{p(i)} \text{ and } R(A, 1) = \sum_{i:AB=1} S(i) \cdot 2^{p(i)}$$

wherein R(A,0) is the weighted load in a first direction having an accounting bit set to a first value and R(A, 1) is the weighted load in the first direction having an accounting bit set to a second value.

21. The method of claim 20 wherein the step of computing the weighted loads further comprises the step of computing a weighted load in a second direction according to:

$$R(B, 0) = \sum_{i:AB=0} S(i) \cdot 2^{p(i)} \text{ and } R(B, 1) = \sum_{i:AB=1} S(i) \cdot 2^{p(i)}$$

wherein R(B,0) is the weighted load in a second direction having an accounting bit set to a first value and R(B,1) is the weighted load in the second direction having an accounting bit set to a second value.

22. The method of claim 21 further comprising the step of summing the weighted load in the first direction having an accounting bit set to a first value and the weighted load in the second direction having an accounting bit set to a second value.

23. The method of claim 22 further comprising the step of summing the weighted load in the first direction having an accounting bit set to a second value and the weighted load in the second direction having an accounting bit set to a first value.

24. The method of claim 23 further comprising the step of comparing the two sums to determine which of the operators generated more income and equalizing the payments between the operators according to the comparison of the two sums.

25. The method of claim 21 further comprising the steps of comparing R(A,0)+R(B,1) to R(A,1)+R(B,0) and equalizing income between the operators by transferring a payment value equal to the half the difference from the operator earning more to the operator earning less.

26. The accounting device of claim 9, wherein the controller computes weighted loads in each direction across the network, including computing a weighted load in a first direction according to:

$$R(A, 0) = \sum_{i:AB=0} S(i) \cdot 2^{p(i)} \quad \text{and} \quad R(A, 1) = \sum_{i:AB=1} S(i) \cdot 2^{p(i)}$$

wherein R(A,0) is the weighted load in a first direction having an accounting bit set to a first value and R(A,1) is the weighted load in the first direction having an accounting bit set to a second value.

* * * * *